UNITED STATES PATENT OFFICE.

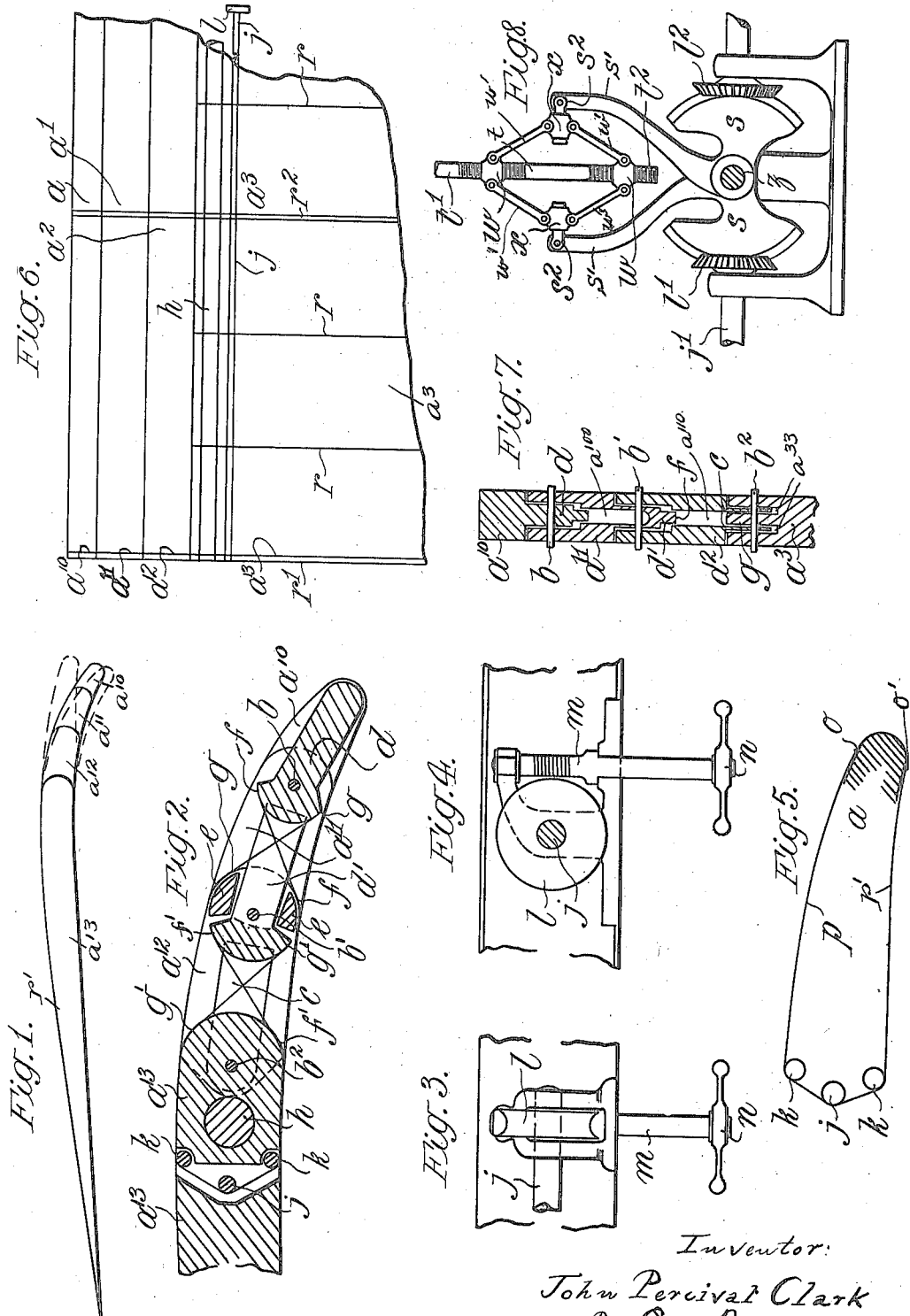

JOHN PERCIVAL CLARK, OF HENDON, ENGLAND.

AIRCRAFT PLANE OR WING.

1,190,378.  Specification of Letters Patent.  Patented July 11, 1916.

Application filed March 31, 1915. Serial No. 18,279.

*To all whom it may concern:*

Be it known that I, JOHN PERCIVAL CLARK, a subject of His Majesty the King of England, residing at Hendon, in the county of Middlesex, Kingdom of England, have invented certain new and useful Improvements in Aircraft Planes or Wings, of which the following is a specification.

This invention relates to improvements in aircraft planes or wings of which the curvature from back to front is capable of variation by the pilot while flying, or at any time, the alteration being either uniform throughout the wing or at a part only.

The object of this invention is to make more perfect the control of aircraft to attain stability and to vary lift and speed.

By this invention, with a given engine power the aircraft could have for:—a first setting in wing curvature, a large lifting effect with a slow speed; and for a second setting in wing curvature, a sufficient sustaining effect, with a high speed; or with variation in engine power, alteration in wing curvature could be made to vary the speed in a horizontal direction; and also other combinations of power, lift, and speed. By this invention stability can be obtained, as when the aircraft banks on one side, an alteration making the curvature of the wings dissimilar, will cause the lift of one wing to exceed that of the other.

The invention consists in making the front of the wings in one or more longitudinal parts articulated together so that when the front part with the leading edge, and the adjoining longitudinal parts, if more than one, are lifted or lowered, the curvature of the wing section will be increased or decreased; this movement may be uniform throughout the front of the wings or non-uniform or restricted to one portion, and may be made in conjunction with or independent of movement of the rear, or trailing, edge of the plane or of the aircraft elevator or of the tail plane. The change of curvature of the ribs, is effected wholly by the pivotal action of the sections of the ribs and not by their distortion. The movement of the articulated portion of the wing is by suitable connection, made controllable from a convenient place in the aircraft.

One form of construction is illustrated in the accompanying drawings in which—

Figure 1 is a section of an aircraft wing, the solid line being the normal position for flight, while the upper dotted line shows the articulated front portion lifted so as to flatten the wing curvature, and the lower dotted line shows the articulated front portion lowered to give increased curvature to the wing section. Fig. 2 is a longitudinal section of the forward portion of one of the main ribs. Figs. 3 and 4 are fragmental detail views, in elevation, taken at right angles to each other, of the operating device for the controlling shaft. Fig. 5 is a diagram of the cable connections. Fig. 6 is a plan view of Fig. 1. Fig. 7 is a fragmental longitudinal section, taken at right angles to Fig. 2. Fig. 8 is an elevation showing the controlling device which is located near the pilot.

Referring more particularly to said drawing, $a$, $a^1$, $a^2$ indicate the movable parts which, according to the invention, constitute the forward portion of the wing or plane; $a^3$, the back or body of said wing; and $r$, $r^1$ and $r^2$, the ribs with which the wing is equipped, $r^1$ and $r^2$ being the main ribs, and $r$ the intermediate ribs that are connected only to the portion $a^3$. The parts $a$, $a^1$, $a^2$ are framed to, and carried by, the forward portions of the main ribs $r^1$ and $r^2$, as shown.

The aforesaid ribs $r^1$ and $r^2$ are made in sections, which are jointed together in the manner represented in Figs. 2 and 7. The foremost section $a^{10}$ has its rear portion thinned or cut away at opposite sides to form a rearwardly-projecting tongue $d$ whose free rear end, in turn, is made segment-shaped, as clearly illustrated in Fig. 2, and this tongue $d$ has a rocking fit in a longitudinal socket or recess $a^{100}$ formed centrally in the intermediate section $a^{11}$, which has an approximately bifurcated formation. The rear portion of the section $a^{11}$ is likewise reduced, to form a similar tongue $d^1$ that has a rocking fit in a longitudinal socket or recess $a^{110}$ formed in the adjoining section $a^{12}$, said tongue $d^1$ terminating, in like manner, in a segmental enlargement or head. The front edge of the body portion or section $a^{13}$ of the rib is rounded, as shown in Fig. 2, and is formed with a pair of inwardly-extending recesses $a^{33}$ for the reception of rearwardly-projecting lugs $c$, with which section $a^{12}$ is equipped. The parts $d$ and $a^{10}$ are connected by a transverse pivot pin $b$; the parts $d^1$ and $a^{12}$ by a similar pin $b^1$; and the parts $c$ and $a^{13}$ by a third pin $b^2$. In consequence of this arrangement the section $a^{10}$ is rendered capable of rocking up or down about pin $b$ as an axis, while similar movements are also permitted to the succeeding sections $a^{11}$ and $a^{12}$ about the pins $b^1$ and $b^2$, the movement of the intermediate section $a^{11}$ being limited, however, by means of a pair of stops or shoulders $e$, with which the section $a^{12}$ is provided, these stops being located upon opposite sides of tongue $d^1$.

The rib sections are additionally connected to one another by means of devices which, in the construction shown in Fig. 2, are in the form of cables, although flexible struts or links may be used in place thereof, if desired. According to the construction illustrated, the rounded end of the body $a^{13}$ of the rib is joined by a pair of cables $f^1$, $f^1$ and $g^1$, $g^1$, to the diagonally opposite corners of the segmental enlargement or head of tongue $d^1$, the cables crossing each other; while a similarly-arranged pair of cables $f, f$ and $g, g$ connect the stops $e, e$ with the diagonally opposite corners of the enlarged end or head of tongue $d$. Owing to the provision of these cables, or their equivalents, the section $a^{12}$, when raised in the manner hereinafter described, will rock the adjoining section $a^{11}$ in an upward direction; and the latter section, in turn, will rock up the front section $a^{10}$, the reverse taking place when section $a^{12}$ is rocked downward. Consequently, during the upward movement of said sections, the curvature of the wing or plane is decreased; and during the downward movement thereof, it is increased. To effect this upward or downward flexion or warping of the movable front edge of the wing or plane, a strut, (not shown), may be attached directly to said edge and led backward to the pilot for connection to a suitable operating member; or, if preferred, the following controlling device, indicated diagrammatically in Fig. 5, may be employed:—To the aforesaid front edge, at oppositely-located upper and lower points $o, o^1$, are secured the forward ends of a pair of cables $p, p^1$, which lead across the upper faces of the plane, and across upper and lower guide rollers $k$, to a controlling shaft $j$, to which latter they are connected in such a way as to alternately wind and unwind when said shaft is rotated. The rotation of said shaft $j$ may be accomplished by turning a hand-wheel $n$, (Figs. 3 and 4), which is fixed to a worm shaft $m$ engaging and driving a worm wheel $l$ on shaft $j$, the worm shaft being disposed centrally of the controlling shaft and within easy reach of the pilot. There may be one of these controlling devices for each side of the plane, or the same one may be used for both sides of the plane.

To combine the control of the movable front edge of the plane with the ascending device or other controls of the ship, the following arrangement may be adopted:—The shaft $j$ aforementioned, may be connected in any suitable manner with a pair of shafts $j^1$ and $j^2$, (Fig. 8), arranged in alinement with each other at opposite sides of the ship. The usual controlling bar or handle $t$ may have its threaded portions $t^1$, $t^2$, fitted with a pair of nuts $w$, each of which is pivotally connected by a pair of links $w^1$, arranged toggle fashion to collars $x$, the latter being rotatably mounted on pins or studs $s^2$, that are pivoted to the free, upper ends of a pair of curved arms or levers $s^1$ whose lower portions are offset and formed as gear segments $s$. These segments $s$ mesh with gears $l^1$ and $l^2$, secured to shafts $j^1$ and $j^2$, respectively, the arrangement being such, therefore, that any rotation of bar $t$ will cause the nuts $w$ to move toward or from each other, according to the direction of such rotation, whereupon the levers $s^1$ will be rocked, said levers swinging about the stud or shaft $z$ whereon they are mounted and serving to produce rotation of shafts $j^1$, $j^2$ in the same direction by means of the intermeshing gearing $s$, $l^1$, $s$, $l^2$. The ascending wires or cables, (not shown), may be connected to the bar $t$ at the points $t^1$, $t^2$, and since said bar is capable of a backward or forward swinging movement about the pins $s^2$, such movement will cause the operation of said wires, as will be understood, and if the warp or aileron wires are also connected to said bar, they, likewise, will be operated. If the bar $t$ is swung to either side, instead of backwardly or forwardly, the levers $s^1$ will be shifted in the same direction, thereby causing rotation of shafts $j^1$, $j^2$ in opposite directions.

What I claim as my invention and desire to secure by Letters Patent of the United States is:—

1. An aircraft plane or wing having a front portion composed of a plurality of longitudinal sections which are disposed one behind another and are articulated together for movement up or down relative to one another, so as to vary the curvature of the wing section; and connections between the successive articulated sections for transmitting the movement of one section successively to the remaining sections, so as to cause said sections to act together symmetrically, when moved up or down.

2. An aircraft plane or wing having a front portion composed of a plurality of longitudinal sections which are disposed one behind another and are articulated together for movement up or down relative to one another, so as to vary the curvature of the wing section; and flexible elements connecting the successive articulated sections together for transmitting the movement of one section successively to the remaining sections, so as to cause said sections to act together symmetrically, when moved up or down.

3. In an aircraft, the combination of a plane or wing having a front portion composed of a plurality of longitudinal sections which are disposed one behind another and are articulated together for movement up or down relative to one another, so as to vary the curvature of the wing section; connections between the successive articulated sections for transmitting the movement of one section successively to the remaining sections, so as to cause said sections to act together symmetrically, when moved up or down; and means for operating and controlling said sections from a point in the aircraft remote from said wing.

4. An aircraft plane or wing having a plurality of supporting ribs each having a front portion composed of a plurality of structurally-separate, articulated sections, and connections between the sections of each rib whereby the movement of one section thereof in a vertical direction will produce movement of the remaining sections thereof in the same direction, to change the curvature of the wing section.

5. An aircraft plane or wing having a front portion composed of a plurality of longitudinal sections disposed one behind another and articulated directly together for movement up or down relative to one another, so as to vary the transverse curvature of the wing; and means for operating and controlling the movement of said sections.

6. An aircraft plane or wing having a front portion composed of a plurality of longitudinal sections disposed one behind another and articulated directly together for movement up or down relative to one another, so as to vary the transverse curvature of the wing; connections between the successive sections for transmitting the movement of one part successively to the remaining sections, so as to cause said sections to act together symmetrically when moved up or down; and means for operating and controlling the movement of said sections.

In testimony whereof I have hereunto signed this specification in the presence of two subscribing witnesses.

JOHN PERCIVAL CLARK.

Witnesses:
GEORGE BELL,
C. D. CLARK.